United States Patent [19]
Baldwin et al.

[11] 3,714,267
[45] Jan. 30, 1973

[54] PROCESS FOR THE NITROSATION OF M-CRESOL

[75] Inventors: Roger A. Baldwin, Oklahoma City, Okla.; Ming T. Cheng, Buena Park, Calif.

[73] Assignee: Kerr-McGee Corporation, Oklahoma City, Okla.

[22] Filed: June 3, 1970

[21] Appl. No.: 43,232

[52] U.S. Cl. ................................260/621 N
[51] Int. Cl. ...................................C07c 39/02
[58] Field of Search ........................260/621 N

[56] References Cited

UNITED STATES PATENTS

| | | | |
|---|---|---|---|
| 1,502,849 | 7/1924 | Ehrlich | 260/621 N |
| 3,320,324 | 5/1967 | Kouba | 260/621 N |

*Primary Examiner*—Howard T. Mars
*Assistant Examiner*—Norman Morgenstern
*Attorney*—William G. Addison

[57] ABSTRACT

The invention provides a process for the nitrosation of m-cresol which includes the simultaneous addition of separate streams of a nitrosating agent and m-cresol to a quantity of a cold aqueous acid solution.

4 Claims, No Drawings

PROCESS FOR THE NITROSATION OF M-CRESOL

BACKGROUND OF THE INVENTION

Heretofore, several nitrosation processes have been suggested for the preparation of nitrosophenolic compounds. Generally, the yield in such processes was low due to the formation of undesirable tars and colored impurities.

In one such method, dilute sulfuric acid is added to the phenolic compound that has been dissolved in a slight excess of sodium hydroxide and sodium nitrite. The reaction is carried out at a temperature of about 0°–5°C. and after the reaction is complete, the mixture is poured onto ice and the product isolated therefrom. See W. J. Hickenbottom, *Reactions of Organic Compounds*, Longmuns, Green and Co., New York, 1950, p. 118.

In another process, solid quantities of sodium nitrite are added to an ethanol solution of a phenolic compound and concentrated hydrochloric acid at 0°C. Again, the reaction mixture is poured onto ice and the product isolated. See R. M. Hollingworth, "Biochemical Factors Determining Selective Toxicity of the Insecticide Sumithion and Its Analogs", Ph.D. Thesis, University of California, Riverside, 1966, p. 53.

In still another process, dilute sulfuric acid is added to a suspension of a phenolic compound and sodium nitrite maintained in a large volume of ice water. The temperature is maintained below 5°C. until the reaction is completed, after which the product is recovered by filtration. See D. A. Shirley, *Preparation of Organic Intermediates*, John Wiley & Sons, Inc., New York, 1951, p. 203.

U.S. Pat. No. 3,320,324 discloses a process in which phenol, sodium nitrite and mineral acid, each in the form of an aqueous solution, is continuously and simultaneously brought together with rapid agitation at 0°–15C. in an aqueous medium containing the sodium salt of said mineral acid and saturated with the para nitrosophenol product. The aqueous medium is maintained at a pH less than 5 during the reaction. The patentee indicates that such a process results in yields of up to, at most, about 85 percent of p-nitrosophenol.

None of the foregoing processes is completely satisfactory because the product obtained is dark-colored or obtainable in only relatively poor yields, i.e., no more than about 85%.

DESCRIPTION OF THE INVENTION

The present invention provides a process for the nitrosation of m-cresol which includes the simultaneous introduction of separate streams of a nitrosating agent and m-cresol into a relatively large volume of an aqueous solution of mineral acid. The 4-nitroso-m-cresol product is obtained in high yields, i.e., more than 90 percent, and is light in color.

More particularly, the invention comprises simultaneously introducing separate streams containing an aqueous solution of about 1.18 to 2.0 equivalents of sodium nitrite and about 1.0 equivalent of m-cresol into a reaction vessel containing about 3.3 to 8.0 equivalents of a solution of mineral acid per equivalent of m-cresol. The mixture is continuously and vigorously agitated while maintaining the temperature within the range of from about −5 to +10°C. The product produced is crystalline 4-nitroso-m-cresol suspended in the acid solution. The product is recovered by filtering or otherwise separating it from the acid solution, after which it may be washed and dried.

The compound thus prepared finds utility in the photographic, dye and rubber industries, as well as being a valuable chemical intermediate for the manufacture of insecticides particularly O,O-dimethyl-O-(3-methyl-4-nitrophenyl)-phosphorthioate.

Suitable nitrosating agents include alkali metal and alkaline earth metal nitrites. Particularly satisfactory results are obtainable using sodium or potassium nitrite.

Any mineral acid may be used in the process of this invention but particularly satisfactory results are obtainable using either hydrochloric acid or sulfuric acid. The use of hydrochloric acid is preferred since it has been determined that the use of this reactant results in a much faster reaction which can be controlled readily.

The amount of mineral acid employed has been found to be critical to the successful operation of the present process. Thus, the vessel in which the reaction is to be carried out initially must contain a large quantity of mineral acid. Specifically, the acid must be present initially in amounts within the range of 2.8 to 4.0 equivalents for each equivalent of nitrosating agent to be added.

Preferably, at least about 3.0 equivalents of acid are employed for each equivalent of nitrite. If lesser amounts of acid are employed, the reaction time is markedly reduced and product yields and quality are adversely affected. It is a feature of the present invention that the reaction rate is so fast that side reactions are avoided or minimized to such an extent that the excess acid values remaining after removal of the product are not contaminated and, therefore, can be recycled and reused in the process.

It was surprising to find that practice of the process of this invention provided 4-nitroso-m-cresol in high yields and of good color since the m-cresol is introduced with the nitrosating agent into a large excess of mineral acid. It would be expected that such a process would yield highly colored and impure products. Surprisingly, this does not occur.

It has been determined that once dark colored impurities develop, as they do in certain prior processes, it is difficult and expensive to remove them. Surprisingly, this does not occur in the practice of the process of the present invention.

Further, there is no need in the present invention to utilize a salt to reduce the solubility of the 4-nitroso-m-cresol product in the reaction mixture to prevent undesirable side reaction. Such practice was common in prior and less efficient processes. In fact, the reaction of this invention is so fast that side reactions are avoided or substantially minimized.

It has been determined that the normality of the mineral acid in the reaction mixture must be controlled since this affects the rate of reaction as well as the solubility of the reactants and reaction product in the acid. The normality of the acid solution initially should be within the range of from about 2.5 to 7.5, preferably about 3.0 to 4.0.

The quantities of nitrosating agent and m-cresol employed are critical. Thus, it has been found that initially there must be a slight stoichiometric excess of nitrosating agent to m-cresol to provide the desirable high yields. On the other hand, too much nitrite is wasteful. The preferred ratio of these reactants is 1.2 equivalents of sodium nitrite for each equivalent of the m-cresol although the range may be from as low as 1.18 to as high as 2.0.

In general, it has been found that the reaction is complete in about 1 to 3 hours when hydrochloric acid is employed. With sulfuric acid, under comparable reaction conditions somewhat longer reaction times are required. The actual reaction time of any given run will depend, of course, on the particular reactants employed. The rapid rate at which the process of this invention is completed is surprising in view of the prior art processes in which the nitrosating reaction usually took considerably longer for completion and still resulted in low yields of poor quality product.

PREFERRED EMBODIMENTS OF THE INVENTION

The following specific examples are set forth to further illustrate the process of the present invention. It should be understood that these examples are illustrative and not limiting, the scope of the invention being defined by the appended claims. All parts given are by weight unless otherwise indicated.

EXAMPLE 1

A solution of 600 ml of 37 percent hydrochloric acid (7.24 moles) in 1200 ml of water was placed in a 3 liter beaker fitted with a high speed mechanical stirrer and thermometer. The solution was cooled to 0°C. To said cooled solution was added, simultaneously, separate streams of (1) 365 ml of an aqueous solution containing 165 grams (2.4 moles) of sodium nitrite and (2) 135 ml (162 grams, 1.42 moles) of 95 percent m-cresol. The reactants were added at such a rate that initially there were 1.75 equivalents of nitrite per equivalent of m-cresol and 2.86 equivalents of hydrochloric acid per equivalent of nitrite. The acid initially was 4 normal.

After the additions of sodium nitrite and m-cresol were completed, the reaction mixture was stirred while maintaining the temperature at about 0°–5°C. The product obtained was crystalline 4-nitroso-m-cresol. It was recovered by filtration, after which it was water washed and air dried. It was tan in color and weighed about 191.5 grams for a yield of about 99 percent.

The following table illustrates additional runs made in accordance with the process of the present invention.

It will be noted that Examples 2 and 3 were carried out with exactly the same ratios of reactants. However, in Example 2 all of the acid values, m-cresol and necessary water were placed in the reaction vessel and cooled to the reaction temperature of less than 10°C. While the subsequent addition of the sodium nitrite solution resulted in high purity 4-nitroso-m-cresol, the yield was only 84.2%. Comparison with Example 3 utilizing the procedure of this invention clearly demonstrates the superiority of this process.

If the ratio of acid to nitrite were reduced to 2 as in Example 7, the resulting yield of 4-nitroso-m-cresol dropped to only about 82 percent and the purity of the product was similarly reduced. However, in Example 8, when the ratio of the acid to nitrite was increased to 3, within the preferred ratio, the product yield increased to 94.7 percent. Further, Example 14 demonstrates that the use of only 1.16 equivalents of sodium nitrite to one equivalent of m-cresol also results in decreased yield.

Example 6 was performed by adding only 2.4 equivalents of fresh hydrochloric acid to the 4.85 equivalents of acid recovered from Example 5. This reuse of the acid values from a previous preparation illustrates the lack of the formation of impurities and colored substances. Thus, it can be seen that the process of the present invention lends itself to continuous operation, if desired, using recovered acid values.

Examples 9, 13 and 17 illustrate the successful utilization of sulfuric acid in this process for the nitrosation of m-cresol.

What is claimed is:

1. A process for producing 4-nitroso-m-cresol comprising simultaneously introducing separate streams of 1.0 equivalent of m-cresol and about 1.18 to 2.0 equivalents of a nitrosating agent selected from the group consisting of alkali metal and alkaline earth metal nitrites into an aqueous solution of mineral acid having a normality of from about 2.5 to 7.5 at a temperature of about −5° to +10°C. to form 4-nitroso-m-cresol and recovering said 4-nitroso-m-cresol from the solution, said mineral acid being present in an amount sufficient to provide about 3.3 to 8.0 equivalents of mineral acid for each equivalent of m-cresol.

2. A process as set forth in claim 1 wherein the mineral acid is selected from the group consisting of hydrochloric acid and sulfuric acid.

3. A process as set forth in claim 1 wherein about 1.2 equivalents of nitrosating agent for each equivalent of m-cresol are introduced into the acid solution which contains at least about 3.0 equivalents of mineral acid for each equivalent of nitrosating agent.

TABLE I

Preparation of 4-nitroso-m-cresol

| Example No. | m-Cresol, moles | Sodium nitrite | | Hydrochloric acid | | Reaction time | | Reaction temp. (°C) | Product | |
|---|---|---|---|---|---|---|---|---|---|---|
| | | Molarity | Moles | Normality | Equivalents | Addition (hr.) | Total (hr.) | | Yield (percent) | M.P. (° C.) |
| 2 | a 0.237 | 8.4 | 0.42 | 4 | 1.20 | 1.0 | 2.0 | 4 to 5 | 84.2 | 162 |
| 3 | a 0.237 | 8.4 | 0.42 | 4 | 1.20 | 1.5 | 2.5 | 0 to 2 | ~100 | 160–162 |
| 4 | a 1.425 | 8.0 | 2.4 | 4 | 7.20 | 1.75 | 5.5 | 2 to 3 | 98.9 | |
| 5 | a 1.425 | 8.0 | 2.4 | 4 | 7.20 | 4.5 | 5.0 | 1 to 2 | 90.9 | 160–162 |
| 6 | a 1.425 | 8.0 | 2.4 | 3.37 | 2.4 | 2.75 | 3.0 | 2 to 3 | 92.6 | 160–162 |
| 7 | a 1.425 | 9.0 | 1.8 | 3.28 | 3.6 | 3.5 | 4.5 | 1 to 4 | 82.1 | 155–159 |
| 8 | a 1.425 | 9.0 | 1.8 | 3.72 | 5.4 | 1.25 | 3.25 | 0 to 2 | 94.7 | 161–162 |
| 9 | a 0.95 | 8.5 | 1.4 | c 4.10 | c 4.4 | 2.0 | 2.0 | 3 to 5 | 92.1 | 157–158 |
| 10 | a 1.425 | 6.1 | 2.1 | 6.9 | 8.15 | 2.0 | 2.0 | 1 to 6 | 99 | 158 |
| 11 | a 1.425 | 5.84 | 2.1 | 6.9 | 8.40 | 1.25 | 1.25 | −2 to 6 | 97.3 | 158 |
| 12 | a 1.425 | 5.94 | 2.1 | 7.25 | 8.40 | 1.0 | 1.25 | −2 to 9 | 95 | 158 |
| 13 | a 1.425 | 8.4 | 2.1 | c 4.5 | c 6.30 | 1.0 | 1.0 | 3 to 5 | 90.9 | 164–165 |
| 14 | a 0.95 | 11.0 | 1.1 | c 4.13 | c 3.30 | 1.0 | 1.25 | 0 to 4 | 80 | 156–158 |
| 15 | a 0.475 | 11.6 | 0.7 | c 2.62 | c 2.1 | 0.67 | 0.67 | 0 to 3 | 94 | 160–162 |
| 16 | b 0.5 | 8.56 | 0.6 | 2.78 | 1.8 | 0.25 | 0.9 | 0 to 8 | 92 | 165–167 |
| 17 | b 0.5 | 8.56 | 0.6 | c 4.5 | c 1.8 | 1.50 | 1.50 | 0 to 3 | 86 | 163–164 | a 95% purity m-cresol utilized.
b 98% purity m-cresol utilized.
c Sulfuric acid.

4. A process as set forth in claim 1 wherein the normality of the acid solution initially is within the range of from about 3.0 to 4.0.

* * * * *

UNITED STATES PATENT OFFICE
CERTIFICATE OF CORRECTION

Patent No. 3,714,267    Dated January 30, 1973

Inventor(s) Roger A. Baldwin and Meng T. Cheng

It is certified that error appears in the above-identified patent and that said Letters Patent are hereby corrected as shown below:

Assignee should read -- Kerr-McGee Chemical Corp. --

Signed and sealed this 1st day of May 1973.

(SEAL)
Attest:

EDWARD M. FLETCHER, JR.　　　　　　ROBERT GOTTSCHALK
Attesting Officer　　　　　　　　　　Commissioner of Patents